United States Patent
Lipscomb et al.

(10) Patent No.: US 6,230,167 B1
(45) Date of Patent: *May 8, 2001

(54) METHOD AND APPARATUS FOR GENERATING AND DISPLAYING HOTLINKS IN A PANORAMIC THREE DIMENSIONAL SCENE

(75) Inventors: James S. Lipscomb; William Louis Luken, both of Yorktown Heights; Jai P. Menon, Peekskill; Bengt-Olaf Schneider, Yorktown Heights, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,747

(22) Filed: Nov. 15, 1996

Related U.S. Application Data

(60) Provisional application No. 60/022,424, filed on Aug. 5, 1996, provisional application No. 60/023,143, filed on Aug. 5, 1996, and provisional application No. 60/022,428, filed on Aug. 5, 1996.

(51) Int. Cl.⁷ .............................. G06F 3/00; G06F 17/30; G06T 15/00
(52) U.S. Cl. ........................... 707/501; 345/302; 345/357
(58) Field of Search .................................. 345/302, 357; 707/501

(56) References Cited

U.S. PATENT DOCUMENTS

| | | | |
|---|---|---|---|
| 5,388,192 | * | 2/1995 | Ohsawa et al. ........................ 345/435 |
| 5,396,583 | * | 3/1995 | Chen et al. .......................... 345/427 |
| 5,561,756 | | 10/1996 | Miller et al. ......................... 345/326 |
| 5,594,845 | * | 1/1997 | Florent et al. ........................ 345/427 |

(List continued on next page.)

OTHER PUBLICATIONS

Chen, Sencheng. "QuickTime VR—an Image–Based Approach to Virtual Environment Navigation", Proc. Computer Graphics, Siggraph '95, Associaton of Computing Machinery, pp. 29–38 (reprinted), Aug. 1995.*

Heid, Jim. "QuickTime's New Edge: Apple's QuickTime VR Brings the Best of Virtual Reality to Personal Computers", Macworld, vol. 12, No. 7, pp. 98–104, Jul. 1995.*

(List continued on next page.)

*Primary Examiner*—Mark R. Powell
*Assistant Examiner*—Jeffrey Allen Rossi
(74) *Attorney, Agent, or Firm*—Jay P. Sbrollini; Perman & Green, LLP

(57) ABSTRACT

In a panoramic scene represented by a first environment map comprising a plurality of elements each associated with a color value representing color of the corresponding element, hotlink areas in the scene are defined by a second environment map comprising a plurality of elements. The elements of the second environment map correspond to the elements of said first environment map according to a mapping function. At least one element of the second environment map is associated with hotlink data identifying an action to be performed upon user selection of at least one element of the first environment map that correspond to the at least one element of the second environment map. Preferably, the hotlink data associated with the at least one element of the second environment map includes a color value associated with the element of said second environment map and an entry in a table associating the color value with data identifying the action to be performed upon selection of the at least one element of the first environment map. The hotlink areas defined by the second environment map are displayed by identifying the at least one element of the second environment map, modifying the color value of the elements of the first environment that correspond to the at least one element of the second environment, thereby producing a modified first environment map. The modified first environment map is then rendered for display.

34 Claims, 7 Drawing Sheets

U.S. PATENT DOCUMENTS

| | | | | |
|---|---|---|---|---|
| 5,706,049 | * | 1/1998 | Moghadam et al. | 396/374 |
| 5,708,845 | * | 1/1998 | Wistendahl et al. | 345/302 |
| 5,727,141 | * | 3/1998 | Hoddie et al. | 345/326 |
| 5,737,553 | * | 4/1998 | Bartok | 349/339 |
| 5,923,334 | * | 7/1999 | Luken | 345/423 |
| 5,990,941 | * | 11/1999 | Jackson et al. | 348/207 |

OTHER PUBLICATIONS

"Welcome to QuickTime VR", guide published by Apple, Inc., downloaded from devworld.apple.com, Jan. 1996.*

"Infinite Pictures Launches Panorama Web Navigation Tools; Netscape Navigator Plug–In Provides Giant Step toward Smooth Movement Through Real Space", press release on Buisnesswire from Portland, Oregon, Aug. 1, 1996.*

QuickTime VR—An Image–Based Approach to Virtual Environment Navigation, Shenchang Eric Chen, Apple Computer, Inc., Siggraph, Computer Graphics Proceedings, Annual Conference Series, 1995, pp 29–38, 01/1995.

* cited by examiner

| R Color Value | Hot Link Operation |
|---|---|
| 105 | Display Pan (PinID) |
| 175 | Play Audio (ClipID) |
| ⋮ | |

Fig. 4

METHOD AND APPARATUS FOR GENERATING AND DISPLAYING HOTLINKS IN A PANORAMIC THREE DIMENSIONAL SCENE

CROSS REFERENCE TO RELATED APPLICATIONS

The present application is related to U.S. patent application Ser. No. 60/022,424, U.S. patent application Ser. No. 60/023,143, and U.S. patent application Ser. No. 60/022,428, filed on Aug. 5, 1996 and assigned to the common assignee of the present invention, herein incorporated by reference in their entirety.

BACKGROUND OF THE INVENTION

1. Technical Field

The invention relates generally to image processing systems, and, more particularly, to image processing systems that allow a user to create and view panoramic three dimensional images from data representing multiple views of a scene.

2. Description of the Related Art

Conventional three dimensional graphics applications and associated hardware render scenes composed of one or more three dimensional objects. The objects are typically represented by geometric primitives, for example triangles. The objects are represented by graphics data that represent the position and color of primitives in a model coordinate system. The graphics system renders the scene to display those object(s) of the scene that are visible in a viewing window based upon a view point. The user can navigate through the scene by changing the position and orientation of a view point reference (camera). In addition, animations can be performed by navigating through a series of preselected positions and orientations of the view point reference.

The rendering operation is a computationally intensive process and, thus, typically performed by specialized graphics hardware. Such systems are powerful yet remain costly due to the need for specialized hardware dedicated to this purpose.

Moreover, conventional three dimensional graphics systems require that the user provide a three-dimensional model of the scene (i.e., graphics data that represents the position and color of the geometric primitives of the scene in the model coordinate system). Such models may be created with software in conjunction with peripheral devices (pen tablets, scanners, cameras, etc). For example the software sold under the name CATIA by Daussault of France allows a user to build a three-dimensional model of a scene. However, such modeling software is expensive and, in addition, a significant investment in labor may be required to model even a relatively uncomplicated scene.

Because of the high costs associated with conventional three dimensional graphics systems, alternative solutions have emerged that provide effective yet limited capabilities in creating and viewing a three dimensional scene which are suitable for use on standard personal computers and without the need for dedicated graphics hardware. One such solution is the software developed and sold by Apple Computer, Inc. of Cupertino, Calif. under the name QuicktimeVR. The QuicktimeVR software is segmented into two distinct packages. The first package, which is sold to content providers, is an authoring tool that allows content providers to develop a panoramic three-dimensional image from multiple views of a scene. The second package is a viewer which is distributed to consumers and which allows the consumer to view the panoramic three-dimensional images created by the authoring tool. A more detailed description of the operation of the QuicktimeVR system may be found in Chen, "Quicktime® VR—An Image-based Approach to Virtual Environment Navigation", SIGGRAPH 1995, Los Angeles, Calif., pp. 29–38, and in U.S. Pat. No. 5,396,583 to Chen et al., which is assigned to Apple Computer, Inc.

The QuicktimeVR system utilizes a cylindrical environment map to represent the panoramic view of a scene (or collection of images). Different perspective views are rendered by mapping the cylindrical environment map to a desired viewing window.

A hotlink is an area of the panoramic scene that is associated with an action. For example, the action associated with hotlink may be the loading and displaying of a second environment map, the generation of a multimedia event such as an audio clip or video clip.

The QuicktimeVR system provides for hotlinks to be integrated into the panoramic scene. The location of such hotlinks are made evident to the user by a changing cursor shape in the display window when the user moves the cursor over an area of the scene that is associated with a hotlink. This method is limited because it requires the user to navigate throughout the panoramic scene in order to locate the hotlinks integrated into the scene.

Thus, there is a need in the art to provide for a more effective system for integrating hotlinks into three dimensional panoramic images, and thus provide an improved level of interactive graphical feedback.

SUMMARY OF THE INVENTION

The above-stated problems and related problems of the prior art are solved with the principles of the present invention, method and apparatus for generating and displaying hotlinks in a panoramic three dimensional scene. In a panoramic scene represented by a first environment map comprising a plurality of elements each associated with a color value representing color of the corresponding element, hotlink areas in the scene are defined by a second environment map comprising a plurality of elements, wherein the elements of the second environment map correspond to the elements of said first environment map according to a mapping function. At least one element of the second environment map is associated with hotlink data identifying an action to be performed upon user selection of at least one element of the first environment map that corresponds to the at least one element of the second environment map. Preferably, the hotlink data associated with the at least one element of the second environment map includes a color value associated with the element of said second environment map and an entry in a table associating the color value with data identifying the action to be performed upon user selection of the at least one element of the first environment map.

The hotlink areas defined by the second environment map are displayed by identifying the at least one element of the second environment map, modifying the color value of the elements of the second environment that correspond to the at least one element of the second environment, thereby producing a modified first environment map. The modified first environment map is then rendered for display.

BRIEF DESCRIPTION OF THE DRAWINGS

FIG. 4 is a table that for storing data that associates the hotlinks of the hotlink environment map with an action.

DETAILED DESCRIPTION OF THE PRESENT INVENTION

Figure 1:
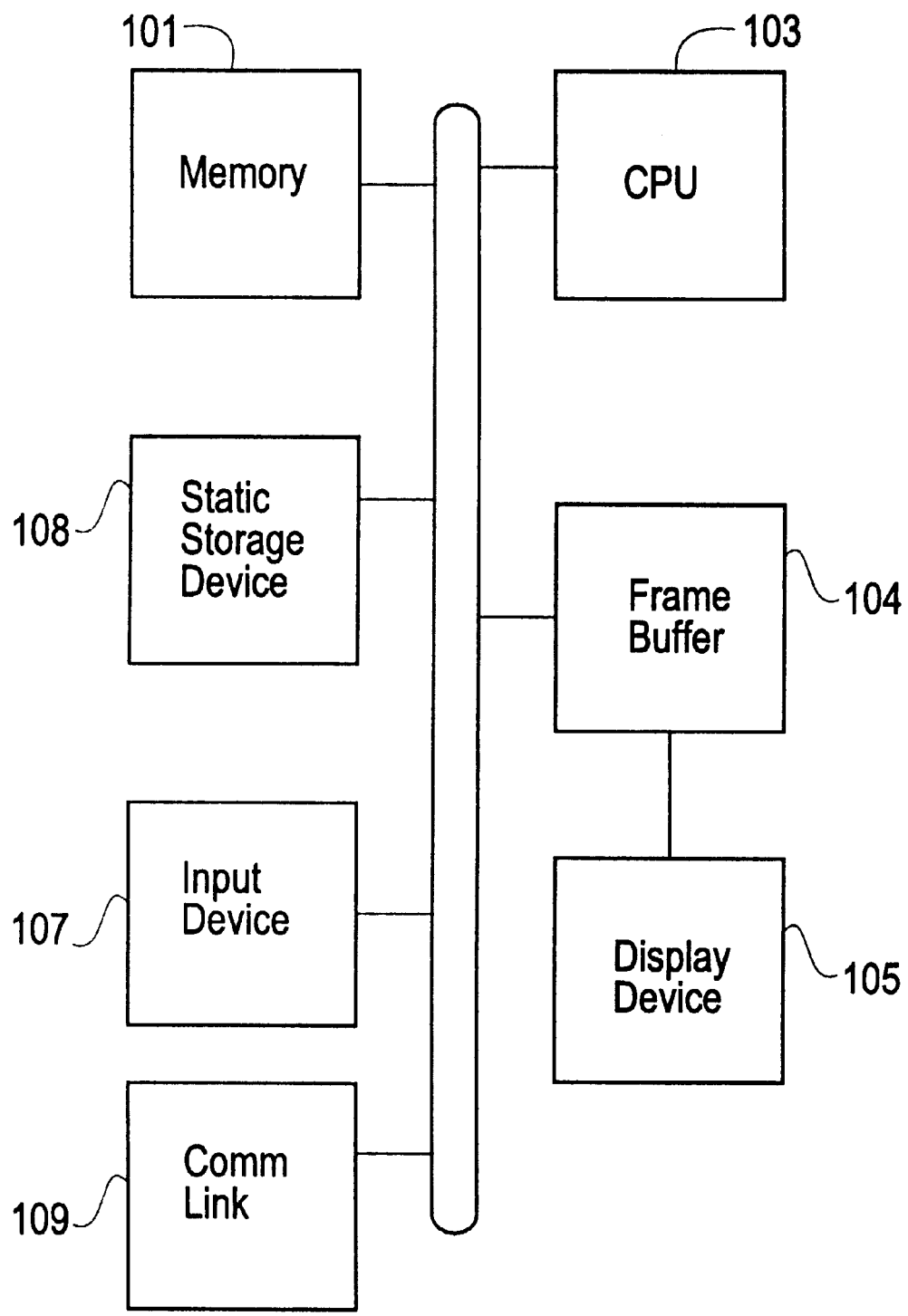
FIG. 1 is a functional block diagram of a computer processing system that may be utilized by the preferred embodiment of the present invention.

A method and apparatus for defining and displaying hotlink areas in an environment map is set forth herein. The present invention may be implemented on any computer processing system including, for example, a personal computer, a workstation, or a graphics adapter that works in conjunction with a personal computer or workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the non-volatile storage device 108 and/or memory 101.

In addition, the computer processing system includes a frame buffer 104 coupled between the CPU 103 and a display device 105 such as a CRT display or LCD display. The frame buffer 104 contains pixel data for driving the display device 105. In some systems, a rendering device (not shown), also known as a graphics accelerator, may be coupled between the CPU 103 and the frame buffer 104.

In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s).

It should be noted that the application program(s) executed by the CPU 103 may perform the rendering methods of the present invention described below. Alternatively, portions or all of the rendering methods described below may be embodied in hardware that works in conjunction with the application program executed by the CPU 103.

What will now be described is an environment map and a hotlink environment map that defines hotlink areas in the environment map. The environment map described below is a cylindrical environment map; however, the present invention is not limited in this respect and may be applied to any environment map, for example, a spherical environment map or polyhedral environment map as set forth in U.S. patent application Ser. No. 60/022,428, incorporated by reference above in its entirety.

A cylindrical environment map is composed of a rectangular array of elements or pixels wherein each pixel includes data representative of the portion of a three dimensional scene contained within the narrow pyramid defined by the origin of the axis of a cylinder and a rectangular area on the surface of the cylinder.

Figure 2:
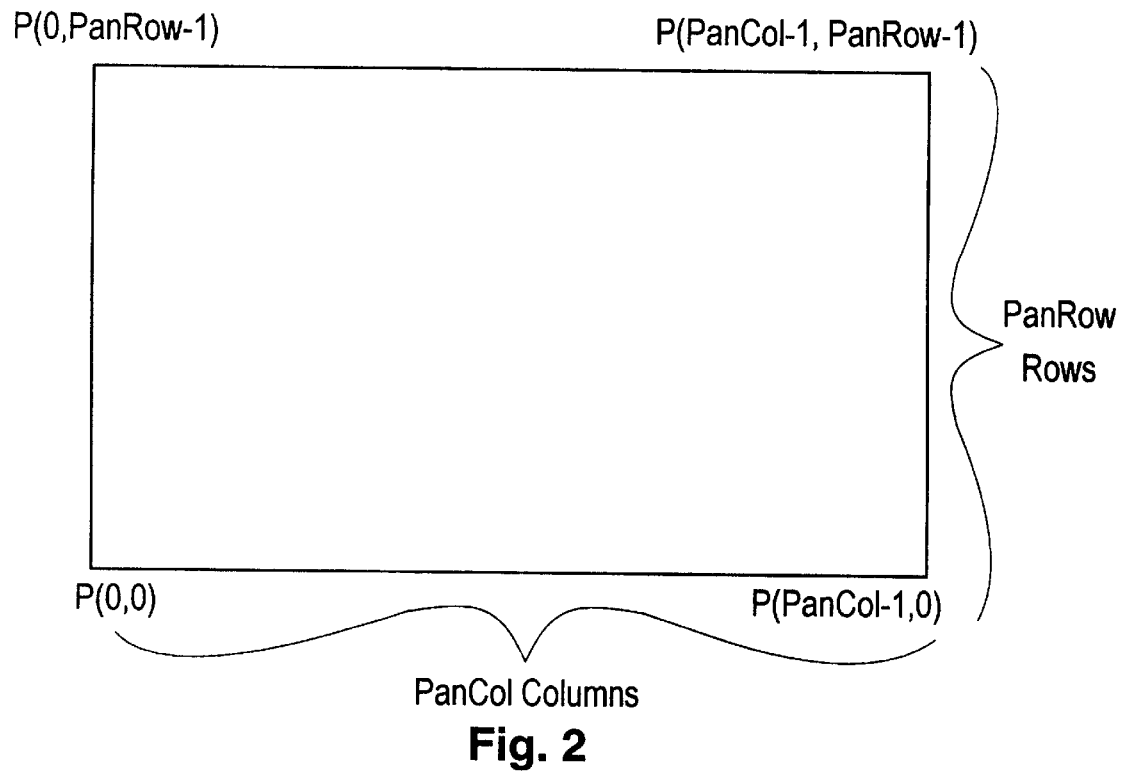
FIG. 2 illustrates a cylindrical environment map.

Each pixel of the cylindrical environment map may be characterized by a column index and row index, where the column index corresponds to an azimuth angle relative to the axis of the cylinder and the origin of the cylinder and the row index corresponds to an elevation angle relative to the axis of the cylinder and the origin of the cylinder. FIG. 2 illustrates an unrolled cylindrical environment map where the horizontal axis corresponds to the column index/azimuth angle of the pixels and the vertical axis corresponds to row index/elevational angle of the pixels. The cylindrical environment map has panRow rows and panCol columns as shown. A complete panorama includes color values for azimuth angles in the range of 0 to $2\pi$, wherein a partial panorama includes color values for azimuth angles in a subset of this range. A Möbus panorama might include color values for azimuth angles in the range o to $4\pi$. A more detailed description of the cylindrical environment map may be found in U.S. patent application Ser. No. 60/023,143, incorporated by reference above in its entirety.

Figure 3:
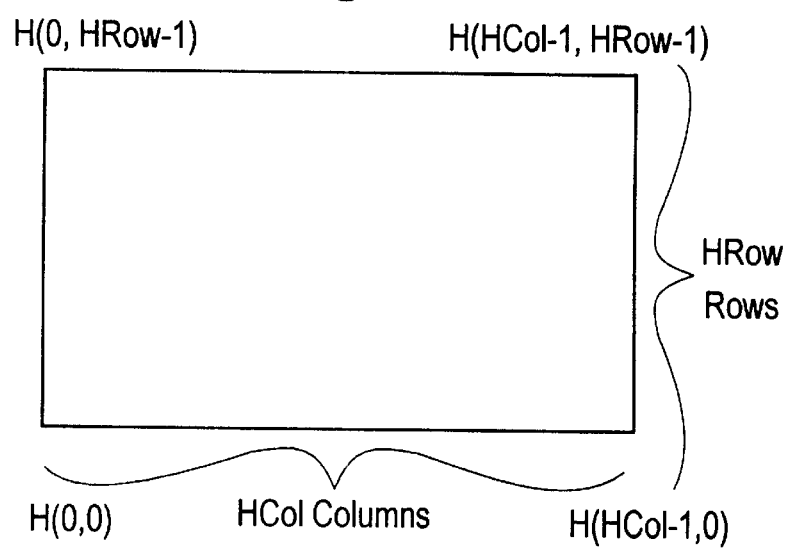
FIG. 3 illustrates a hotlink environment map of the present invention.

According to the present invention, the hotlink areas of the cylindrical environment map are defined by a hotlink environment map, where a mapping function maps the pixels of the hotlink environment map to the pixels of the cylindrical environment map. As shown in FIG. 3, the hotlink environment map preferably is a cylindrical environment map having HRow rows and HCol columns, where HRow is determined by dividing the number of rows of the cylindrical environment PanRow by a scale factor SR, and HCol is determined by diving the number of columns of the cylindrical environment map PanCol by a scale factor SC. In other words, the number of rows and columns of the hotlink environment map (HRow,HCol) are derived by scaling down the number of rows and columns of the cylindrical environment map (PanRow,PanCol).

In this example, the pixels of the hotlink environment map may be denoted by the expression H(i,j) where i is the column index ranging from 0 to (HCol−1) and j is the row index ranging from 0 to (HRow−1). The pixels of the cylindrical environment map may be denoted by the expression P(x,y) where x is the column index ranging from 0 to (PanCol−1) and y is the row index ranging from 0 to (PanRow−1). In this case, each pixel of the hotlink environment map corresponds to an SR by SC block of pixels in the cylindrical environment map. This association may be represented as follows:

$$H(i, j) == \begin{array}{llll} P(x, y), & P(x+1, y) & \ldots & P(x+SC-1, y) \\ P(x, y+1) & P(x+1, y+1) & \ldots & P(x+SC-1, y+1) \end{array}$$

-continued

| | | | |
|---|---|---|---|
| . | . | . | |
| . | . | . | |
| . | . | . | |
| P (x, y + SR-1) | P (x + 1, y + SR-1) | ... | P (x + SC-1, y + SR-1) |
| where x = SR*i and y = SC*i. | | | |

For example, consider the case where the number of rows and columns of the hotlink environment map (HRow,HCol) are derived by scaling down by a factor of 4 the number of rows and columns of the cylindrical environment map (PanRow,PanCol). In this case, the mapping function that maps a pixel of the hotlink environment map H(i,j) to 16 pixels of the cylindrical environment map may be represented as follows:

| H (i, j) == | P (4i, 4j) | ... | P (4i+ 3, 4j) |
|---|---|---|---|
| | . | | . |
| | . | | . |
| | . | | . |
| | P (4i, 4j + 3) | ... | P (4i + 3, 4j + 3) |

For each pixel of the hotlink environment map, a data value is stored that identifies whether the corresponding pixel(s) of the cylindrical environment map is a hotlink area. In addition, for each pixel of the hotlink environment map, information may be stored that points to (or defines) a command or action to be performed upon user selection of the corresponding pixels of the hotlink area in the cylindrical environment map.

The data value stored for each pixel of the hotlink environment map that identifies whether the corresponding pixel(s) of the cylindrical environment map is a hotlink area may be encoded by the red, green, or blue color value of the pixel of the hotlink environment map. For example, the red color value of each pixel may be used to identify whether the corresponding pixel(s) of the cylindrical environment map is a hotlink area. In this case, the blue and green color values of the pixels of the hotlink environment map may be ignored. In addition, for those pixels of the hotlink environment map that correspond to pixels of the cylindrical environment map that are not part of a hotlink area, a null red color value is stored. However, for those pixels of the hotlink environment map that correspond to pixels of the cylindrical environment map that are part of a hotlink area, a red color value within a predetermined range of color values is preferably stored. In other words, the red color value being within the predetermined range of color values represents that the associated pixel corresponds to pixels of the cylindrical environment map that are part of a hotlink area.

For example, the red color values of the system may range from 0 to 255. In this case, for those pixels of the hotlink environment map that correspond to pixels of the cylindrical environment map that are not part of a hotlink area, a 0 (null) red color value is stored. However, for those pixels of the hotlink environment map that correspond to pixels of the cylindrical environment map that are part of a hotlink area, a red color value within the range from 1–255 is stored.

In addition, in order to associate the hotlink areas with the appropriate commands/actions that are to be performed upon user selection of the corresponding pixels of the hotlink area in the cylindrical environment map, each hotlink area is preferably associated with a red color value within the predetermined range of color values. In this case, the pixels of the hotlink environment map that identify a given hotlink area in the cylindrical environment map are assigned a red color value within the predetermined range of color values. In addition, a table is stored that identifies the commands/actions associated with each hotlink area, which is indexed by the red color value assigned to the hotlink area as shown in FIG. 4. For example, a red color value of 105 may be associated with data that represents a hotlink command DisplayPan that controls the system to display the panoramic cylindrical environment identified by the parameter PanID. In another example, a red color value of 175 may be associated with data that represents a hotlink command PlayAudio that controls the system to play the audio clip identified by the parameter ClipID.

As described above, the red color value of the pixel may be used to identify the hotlink areas of the hotlink environment map; however, the present invention is not limited in this respect, and thus any data value may be used as an index to identify the hotlink areas.

Figure 5:
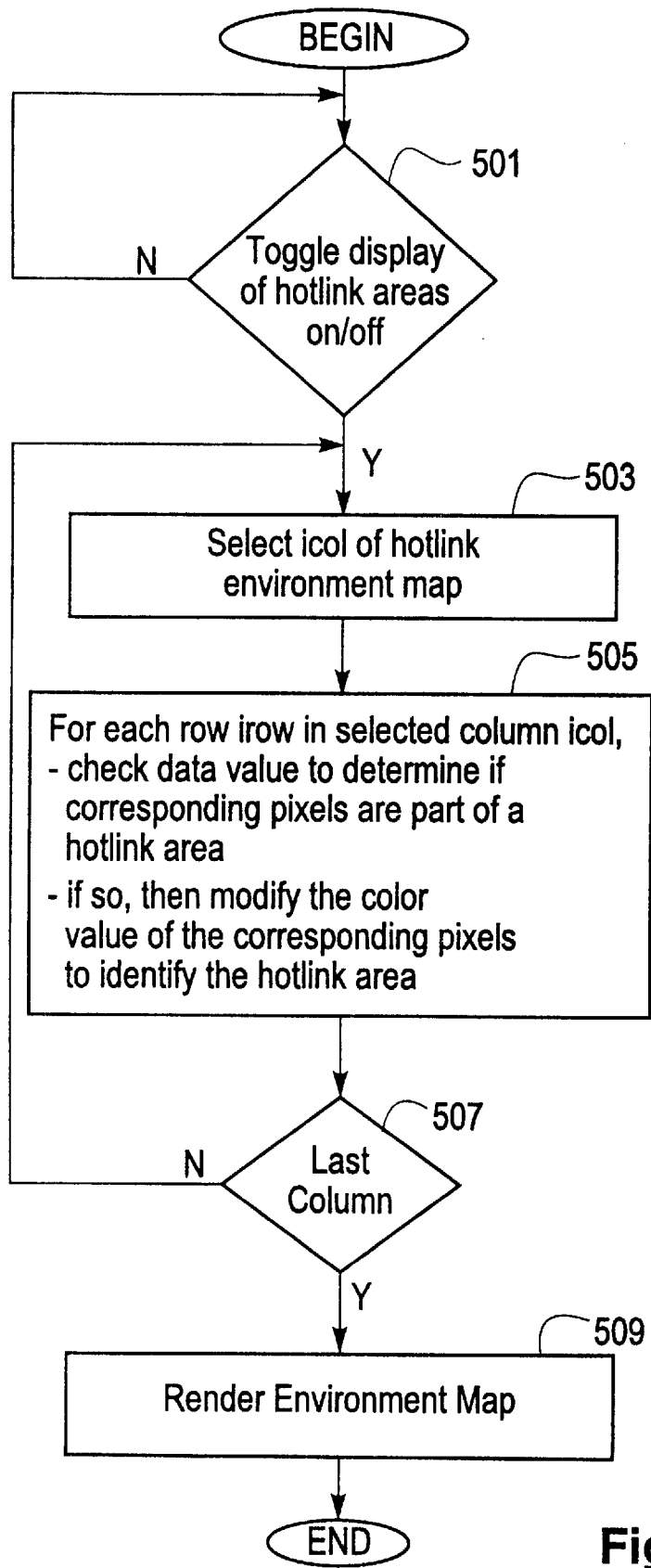
FIG. 5 is a flow chart illustrating operation of displaying hotlink areas of the environment map of FIG. 2 based on the hotlink environment map of FIG. 3 according to the present invention.

Having described a hotlink environment map that defines the hotlink areas of the cylindrical environment map, a mechanism for displaying the hotlink areas defined by the hotlink environment map is now set forth with respect to FIG. 5. The operation begins is step 501 to check whether a user input command requesting that the display of the hotlink areas be toggled on (or off) has been received. The user input command is typically identified by an I/O event (or message). If in step 501 the user input command requesting that the display of the hotlink areas be toggled on (or off) has been received, operation continues to step 503.

In step 503, a column index jcol that corresponds to one of the columns of the hotlink environment map is selected. Preferably, the column index jcol is set to successive values within the range from 0 to (HCol−1).

In step 505, for each row of the selected column jcol of the hotlink environment map, a row index jrow is selected. Preferably, the row index jrow is set to successive values within the range from 0 to (Hrow−1). Each pixel (jrow,jcol) of the hotlink environment map is then processed in step 505 as follows.

The data value associated with the pixel (jrow,jcol) is first checked to determine if the data value indicates that the corresponding pixel(s) of the cylindrical environment map is a hotlink area. If the red color value of the pixel identifies whether or not the corresponding pixel(s) of the cylindrical environment map is a hotlink area as describe above, this may be accomplished by checking if the red color value of the pixel is within the predetermined range of red color values. If the corresponding pixel(s) of the cylindrical environment map is not part of a hotlink area, the processing in step 505 continues to the next pixel in the row.

However, if the corresponding pixel(s) of the cylindrical environment map is part of a hotlink area, preferably the table is searched to determine if the red color value associated with the pixel is stored as a valid entry in the table. This step ensures that the pixel corresponds to a hotlink area. If a matching entry is not found in the table, the processing in step 505 continues to the next pixel in the row.

If a matching entry is found, the pixel(s) of the cylindrical environment map that correspond to the pixel (jrow,jcol) is determined according to the mapping function. In addition, for each of the corresponding pixels of the cylindrical environment map, the color value of the pixel is modified to identify the pixel as part of a hotlink area.

Preferably, the color value of the corresponding pixel(s) of the hotlink area of the cylindrical environment map is modified by a reversible operation on the red, blue, and/or green color values of the pixel. For example, if a 24 bit true color value is stored for each pixel of the cylindrical environment map, the modified value of the red, blue and/or green component may be determined as:

NewValue=Mod (256, OldValue+128)

In another example, if a 8 bit palette color pointer is stored for each pixel of the cylindrical environment map, the modified palette color pointer may be determined as:

NewPointer=Mod (256, OldPointer+128).

The benefit of this operation is that by performing the operation twice, the modification can be reversed. Thus, the unmodified cylindrical environment map data need not be retrieved (or reloaded) after a user input command is received to toggle off the display of the hotlink areas.

In step 507, it is determined if the last column of the hotlink environment map has been processed. If not, operation returns to step 503 to select the next value of jcol. If the last column of the hotlink environment has been processed, the operation continues to step 509.

In step 509, after the processing of all column and rows of the hotlink environment map is complete, the modified cylindrical environment map is rendered for display. The rendering operation is described in detail in U.S. patent application Ser. No. 60/023,143, incorporated by reference above in its entirety. This results in the display of the hotlink areas that are defined by the hotlink environment map if the user input command is a toggle on command. However, if the user input command is a toggle off command, step 509 results in the display of the unmodified cylindrical environment (i.e., the hotlink areas are not displayed).

The procedure outlined above is advantageous when the number of pixels in the hot link environment map is much smaller than the number of pixels in the cylindrical environment map and most of the pixels in the hotlink environment map are not associated with any action (i.e., mostly cold).

Figure 6:
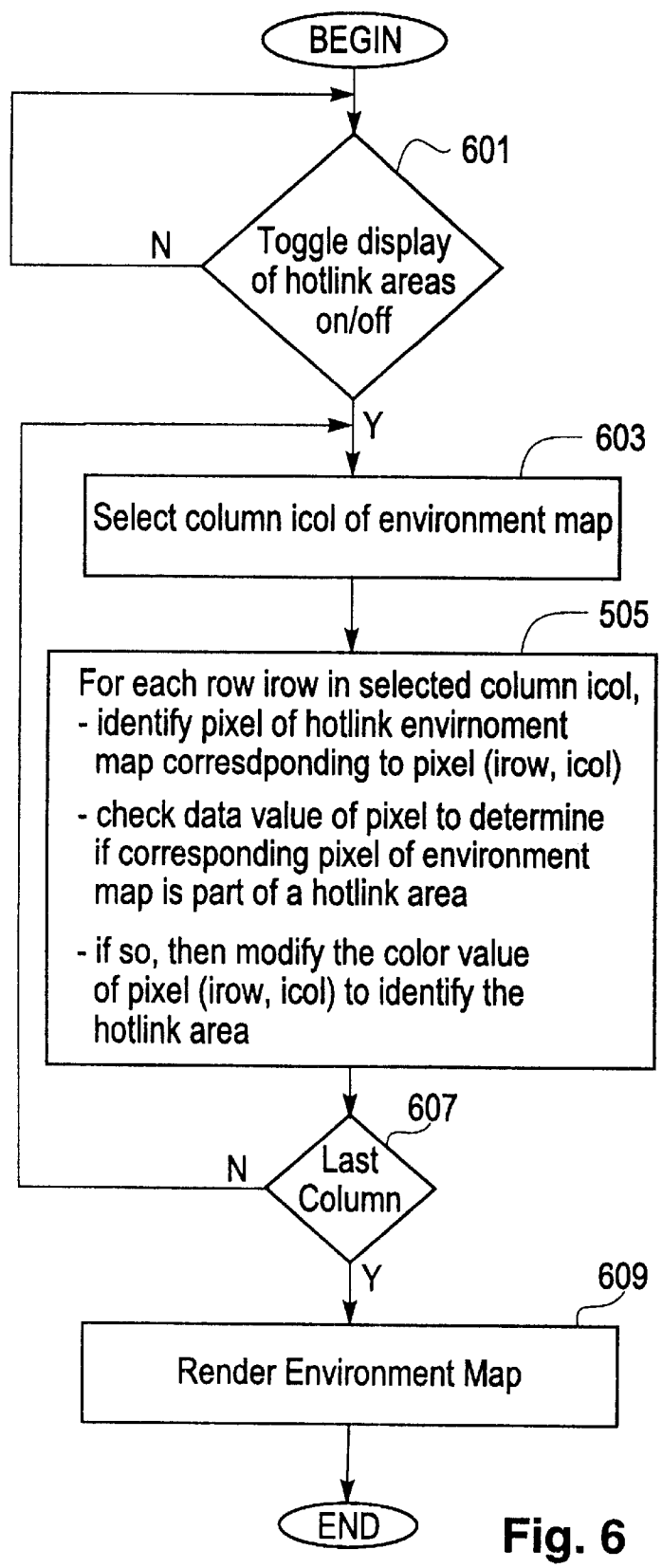
FIG. 6 is a flow chart illustrating operation of displaying hotlink areas of the environment map of FIG. 2 based on the hotlink environment map of FIG. 3 according to an alternate embodiment of the present invention.

An alternative mechanism for displaying the hotlink areas defined by the hotlink environment map is now set forth with respect to FIG. 6. The operation begins is step 601 to check whether a user input command requesting that the display of the hotlink areas be toggled on (or off) has been received. The user input command is typically identified by an I/O event (or message). If in step 601 the user input command requesting that the display of the hotlink areas be toggled on (or off) has been received, operation continues to step 603.

In step 603, a column index icol that corresponds to one of the columns of the cylindrical environment map is selected. Preferably, the column index icol is set to successive values within the range from 0 to (PanCol−1).

In step 605, for each row of the selected column icol of the cylindrical environment map, a row index irow is selected. Preferably, the row index irow is set to successive values within the range from 0 to (PanRow−1). Each pixel (irow,icol) of the cylindrical environment map is then processed in step 605 as follows.

First, the pixel of the hotlink environment map that corresponds to the current pixel (irow,icol) of the cylindrical environment map is identified. For example, the pixel of the hotlink environment map (jrow,jcol) that corresponds to the current pixel (irow,icol) of the cylindrical environment map may be determined as follows:

jcol=icol/SC jrow=irow/SC where SC=PanRow/HRow, which represents the ratio of the number of columns in the cylindrical environment map to the number of rows in the hotlink environment map.

Second, the data value associated with the pixel (jrow,jcol) of the hotlink environment map is checked to determine if the data value indicates that the corresponding pixel(s) of the cylindrical environment map is a hotlink area. If the red color value of the pixel identifies whether or not the corresponding pixel(s) of the cylindrical environment map is a hotlink area as describe above, this may be accomplished by checking if the red color value of the pixel is within the predetermined range of red color values. If the corresponding pixel(s) of the cylindrical environment map is not part of a hotlink area, the processing in step 605 continues to the next pixel in the row of the cylindrical environment map.

However, if the corresponding pixel(s) of the cylindrical environment map is part of a hotlink area, preferably the table is searched to determine if the red color value associated with the pixel (jrow,jcol) is stored as a valid entry in the table. This step ensures that the pixel (jrow,jcol) corresponds to a hotlink area. If a matching entry is not found in the table, the processing in step 605 continues to the next pixel in the row of the cylindrical environment map.

If a matching entry is found, the color value of the pixel (irow,icol) of the cylindrical environment map is modified to identify the pixel as part of a hotlink area. Preferably, the color value of the pixel (irow,icol) of the hotlink area of the cylindrical environment map is modified by a reversible operation on the red, blue, and/or green color values of the pixel. For example, if a 24 bit true color value is stored for each pixel of the cylindrical environment map, the modified value of the red, blue and/or green component may be determined as:

NewValue=Mod (256, OldValue+128)

In another example, if a 8 bit palette color pointer is stored for each pixel of the cylindrical environment map, the modified palette color pointer may be determined as:

NewPointer=Mod (256, OldPointer+128).

The benefit of this operation is that by performing the operation twice, the modification can be reversed. Thus, the unmodified cylindrical environment map data need not be retrieved (or reloaded) after a user input command is received to toggle off the display of the hotlink areas.

In step 607, it is determined if the last column (PanCol−1) of the cylindrical environment map has been processed. If not, operation returns to step 603 to select the next value of icol. If the last column (panCol−1) of the cylindrical environment has been processed, the operation continues to step 609.

In step 609, after the processing of all column and rows of the cylindrical environment map is complete, the modified cylindrical environment map is rendered for display. The rendering operation is described in detail in U.S. patent application Ser. No. 60/023,143, incorporated by reference above in its entirety. This results in the display of the hotlink areas that are defined by the hotlink environment map if the user input command is a toggle on command. However, if the user input command is a toggle off command, step 509 results in the display of the unmodified cylindrical environment (i.e., the hotlink areas are not displayed).

Figure 7A:
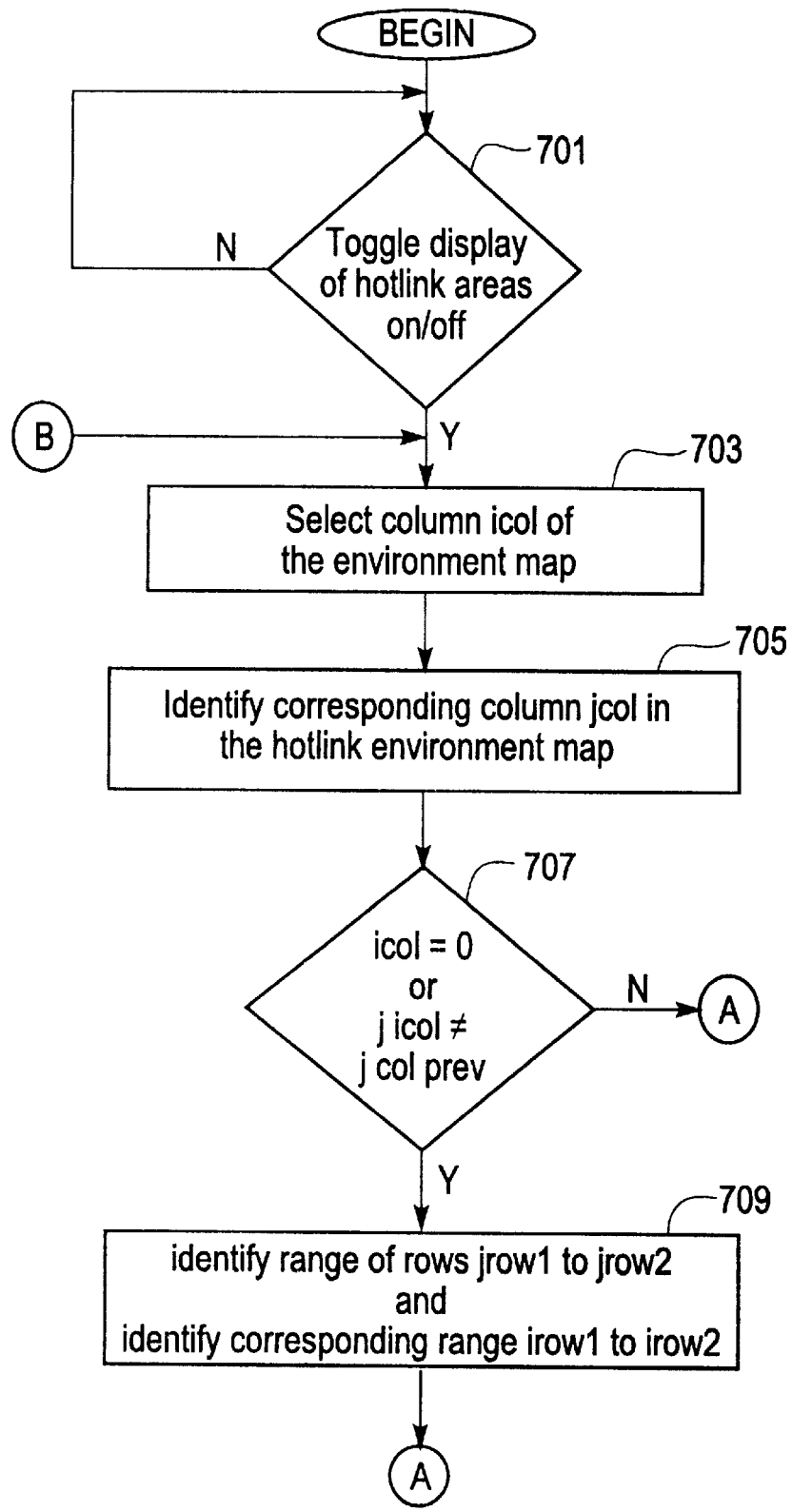
FIGS. 7(A)–(B) is a flow chart illustrating operation of displaying hotlink areas of the environment map of FIG. 2 based on the hotlink environment map of FIG. 3 according to an alternate embodiment of the present invention.
Figure 7B:
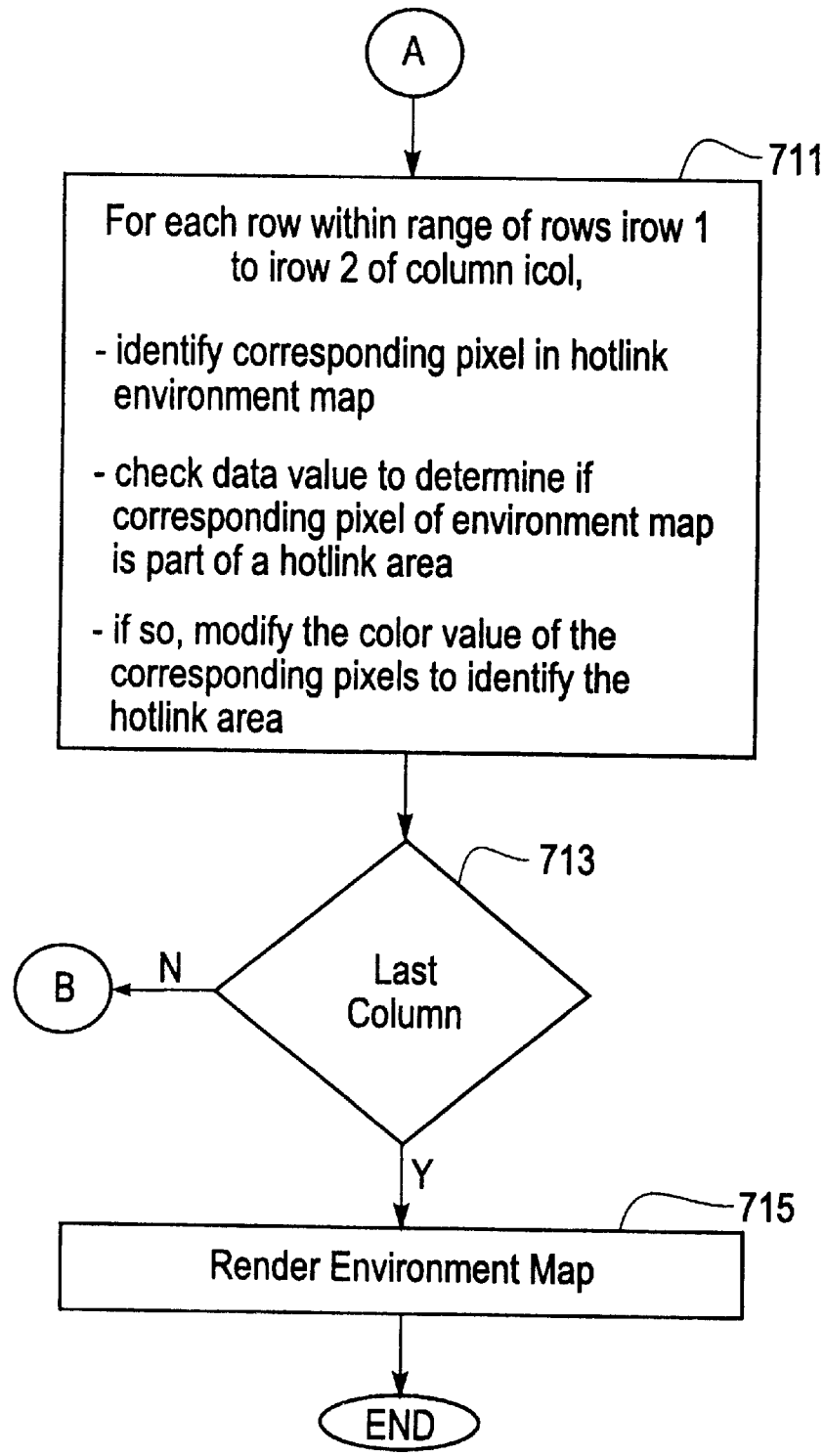

An alternative mechanism for displaying the hotlink areas defined by the hotlink environment map is now set forth with respect to FIG. 7. The operation begins is step 701 to check whether a user input command requesting that the display of the hotlink areas be toggled on (or off) has been received. The user input command is typically identified by an I/O event (or message). If in step 701 the user input command requesting that the display of the hotlink areas be toggled on (or off) has been received, operation continues to step 703.

In step 703, a column index icol that corresponds to one of the columns of the cylindrical environment map is selected. Preferably, the column index icol is set to successive values within the range from 0 to (PanCol−1).

In step 705, the column (jcol) of the hotlink environment map that corresponds to the current column (icol) is identified. For example, the column (jcol) of the hotlink environment map that corresponds to the current column (icol) of the cylindrical environment map may be determined as follows:

jcol=icol/SC where SC=PanRow/HRow, which represents the ratio of the number of columns in the cylindrical environment map to the number of rows in the hotlink environment map.

In step 707, it is determined if one of the following two conditions is satisfied:

(a) the current column (icol) is the first column in the cylindrical environment map (e.g., icol=0); or (b) the corresponding column (jcol) of the hotlink environment map differs from the previously identified column (jcolprev) of the hotlink environment map (e.g., jcol≠jcolprev, where jcolprev=(icol−1)/SC)

If one of the two conditions is satisfied, operation continues to step 709; otherwise operation continues to step 711.

In step 709, for each row of the selected column jcol of the hotlink environment map, a row index jrow is selected. Preferably, the row index jrow is set to successive values within the range from 0 to (Hrow−1). For each pixel (jrow,jcol) within the column (jcol) of the hotlink environment map, the data value associated with the pixel (jrow, jcol) of the hotlink environment map is checked (as described above in step 503) to determine if the data value indicates that the corresponding pixel(s) of the cylindrical environment map is a hotlink area. When processing the rows of the current column (jcol), the first row that stores a data value indicating that the corresponding pixel(s) of the cylindrical environment map is a hotlink area is saved as jrow1, and the last row that stores a data value indicating that the corresponding pixel(s) of the cylindrical environment map is a hotlink area is saved as jrow2. If there are no rows in the current column (jcol) of the hotlink environment map that stores a data value indicating that the corresponding pixel(s) of the cylindrical environment map is a hotlink area, jrow1 and jrow2 are preferably saved as (Hrow−1) and 0, respectively, (or any pair of numbers where jrow1>jrow2). After checking all the rows of the current column (icol), the rows of the cylindrical environment map (irow1,irow2) that correspond to the rows jrow1 and jrow2 are identified. For example, the rows of the cylindrical environment map (irow1,irow2) may be identified as follows:

irow1=jrow1*SC
irow2=jrow2*SC

The operation of step 709 is then complete and operation continues to step 711.

In step 711, the selected column (icol) of the cylindrical environment map is checked for hot pixels. However, instead of checking every row (e.g., irow=0 to (panRow−1)) within the selected column (icol), only those pixels corresponding to rows irow1 to irow2 of the selected column (icol) are considered. This may be accomplished by setting the row index irow to successive values within the range from irow1 to irow2. The pixel (irow,icol) of the cylindrical environment map is processed as follows.

First, it is determined if irow1 is greater than irow2. As set forth above, this condition indicates that the entire row of pixels for the current column (jcol) of the hotlink environment map is cold (i.e., does not store a data value indicating that the corresponding pixel(s) of the cylindrical environment map is a hotlink area). If irow2 is greater than irow1, then the operation ends with respect to the current column (icol) and the operation continues to step 713 to process the next column in the cylindrical environment map.

However, if irow2 is not greater than irow1, then the pixel (jrow,jcol) of the hotlink environment map that corresponds to the current pixel (irow,icol) of the cylindrical environment map is identified. For example, the pixel (jrow,jcol) of the hotlink environment map that corresponds to the current pixel (irow,icol) of the cylindrical environment map may be determined as follows:

jcol=icol/SC
jrow=irow/SC

The data value associated with the pixel (jrow,jcol) of the hotlink environment map is then checked to determine if the data value indicates that the corresponding pixel(s) of the cylindrical environment map is a hotlink area. If the corresponding pixel(s) of the cylindrical environment map is not part of a hotlink area, the processing continues to the next pixel in the row (jrow) of the hotlink environment map. However, if the corresponding pixel(s) of the cylindrical environment map is part of a hotlink area, the color value of the pixel (irow,icol) of the cylindrical environment map is modified to identify the pixel as part of a hotlink area. Preferably, the color value of the pixel (irow,icol) of the hotlink area of the cylindrical environment map is modified by a reversible operation on the red, blue, and/or green color values of the pixel. For example, if a 24 bit true color value is stored for each pixel of the cylindrical environment map, the modified value of the red, blue and/or green component may be determined as:

NewValue=Mod (256, OldValue+128)

In another example, if a 8 bit palette color pointer is stored for each pixel of the cylindrical environment map, the modified palette color pointer may be determined as:

NewPointer=Mod (256, OldPointer+128).

The benefit of this operation is that by performing the operation twice, the modification can be reversed. Thus, the unmodified cylindrical environment map data need not be retrieved (or reloaded) after a user input command is received to toggle off the display of the hotlink areas.

After processing all pixels of the current col (icol) in the range (irow=irow1 to irow2), operation continues to step 713.

In step 713, it is determined if the last column (PanCol−1) of the cylindrical environment map has been processed. If not, operation returns to step 703 to select the next value of icol. If the last column (panCol−1) of the cylindrical environment has been processed, the operation continues to step 715.

In step 715, after the processing of all column and rows of the cylindrical environment map is complete, the modified cylindrical environment map is rendered for display. The rendering operation is described in detail in U.S. patent application Ser. No. 60/023,143, incorporated by reference above in its entirety. This results in the display of the hotlink areas that are defined by the hotlink environment map if the user input command is a toggle on command. However, if the user input command is a toggle off command, step 715 results in the display of the unmodified cylindrical environment (i.e., the hotlink areas are not displayed).

The system preferably utilizes the following operations in step 711 above to determine if the data value stored by the hotlink environment map indicates that the corresponding pixel(s) of the cylindrical environment map is a hotlink area. For exemplary purposes, consider the case described above where the red color value of the pixel identifies whether or not the corresponding pixel(s) of the cylindrical environment map is a hotlink area. In this scenario, the red color value of the previous pixel (jrow−1,jcol) and a link status bit associated with the previous pixel (jrow−1,jcol) is stored. The red color value of the previous pixel (jrow−1,jcol) is preferably initialized to zero. The link status bit when set to '1' indicates the pixel(s) of the cylindrical environment map corresponding to the previous pixel (jrow−1,jcol) is a hotlink area. The link status bit when set to '0' indicates the pixel(s) of the cylindrical environment map corresponding to the previous pixel (jrow−1,jcol) is not part of a hotlink area. The red color value of the current pixel (jrow,jcol) of the hotlink environment is compared to the red color value of the previous pixel (jrow−1,jcol) of the hotlink environment map.

If the two values are equal, the link status bit of the previous pixel (jrow−1,jcol) is read. If the link status bit is set to '1', it is determined that the pixel(s) of the cylindrical environment map corresponding to the current pixel (jrow, jcol) is a hotlink area. However, if the link status bit is set to '0', it is determined that the pixel(s) of the cylindrical environment map corresponding to the current pixel (jrow, jcol) is not part of a hotlink area. The processing then continues to the next pixel in the current column (icol) of the hotlink environment map.

However, if the two red color values are not equal, a table is searched to determine if the red color value associated with the pixel (jrow,jcol) is stored as a valid entry in the table. This step ensures that the pixel (jrow,jcol) corresponds to a hotlink area. If a matching entry is not found in the table, the red color value of the previous pixel (jrow−1,jcol) is set to the red color value of the current pixel (jrow,jcol), the link status bit is set to '0', and it is determined that the pixel(s) of the cylindrical environment map corresponding to the current pixel (jrow,jcol) is not part of a hotlink area. The processing then continues to the next pixel in the current column (icol) of the hotlink environment map. If a matching entry is found, the red color value of the previous pixel (jrow−1,jcol) is set to the red color value of the current pixel (jrow,jcol) and the link status bit is set to '1', and it is determined that the pixel(s) of the cylindrical environment map corresponding to the current pixel (jrow,jcol) is part of a hotlink area. The processing then continues to the next pixel in the current column (icol) of the hotlink environment map.

It should be noted that other data values (other than the red color value of the pixel) may be stored by the hotlink environment map to indicate that the corresponding pixel(s) of the cylindrical environment map is a hotlink area.

Advantageously, the hotlink environment map of the present invention provides the capability of efficiently displaying (and reversing such display) multiple hotlink areas in a panoramic scene, thus improving the interactive feedback provided to the user of the system.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. A method for defining a hotlink area in a panoramic scene comprising the steps of:

providing a first environment map comprising a plurality of elements of a first non-planar three-dimensional surface each associated with a color value representing color of the corresponding element, wherein said first environment map represents a mapping of said panoramic scene onto elements of said first environment map, and wherein said first environment map is rendered according to varying positions and fields of view to provide a view of said panoramic scene as seen from different orientations and fields of view;

generating a second environment map comprising a plurality of elements of a second non-planar and three-dimensional surface, wherein said elements of said second environment map correspond to said elements of said first environment map according to a mapping function, and wherein at least one element of said second environment map is associated with hotlink data identifying an action to be performed upon user selection of at least one element of said first environment map that corresponds to said at least one element of said second environment map, wherein said second environment map represents a mapping of at least one hotlink area in said panoramic scene onto elements of said second non-planar three-dimensional surface, wherein said second environment map is rendered according to varying positions and fields of view to provide a view of said at least one hotlink area in said panoramic scene as seen from different orientations and fields of view.

2. The method of claim 1, wherein each element of said second environment map corresponds to more than one element of said first environment map.

3. The method of claim 1, wherein said first and second environment maps are cylindrical environment maps, wherein said elements of said first and second environment maps are partitioned into a matrix of rows and columns.

4. The method of claim 3, wherein number of rows of said second environment map are a predetermined fraction of said rows of said first environment map.

5. The method of claim 3, wherein number of columns of said second environment map are a predetermined fraction of said columns of said first environment map.

6. The method of claim 1, wherein said hotlink data associated with said at least one element of said second environment map comprises:

a color value associated with said at least one element of said second environment map, and an entry in a table associating said color value with data identifying said action to be performed upon user selection of said at least one element of said first environment map.

7. A program storage device readable by a machine, tangibly embodying data to be utilized by the machine in the execution of a program of instructions, the data comprising:

a first environment map comprising a plurality of elements of a first non-planar three-dimensional surface each associated with a color value representing color of a corresponding element, wherein said first environment map represents a mapping of a panoramic scene onto elements of said first environment map, and wherein said first environment map is rendered according to varying positions and fields of view to provide a view of said panoramic scene as seen from different orientations and fields of view;

a second environment map comprising a plurality of elements of a second non-planar three-dimensional surface, wherein said elements of said second environment map correspond to said elements of said first environment map according to a mapping function, and wherein at least one element of said second environment map is associated with data identifying an action to be performed upon user selection of at least one element of said second environment map, wherein said second environment map represents a mapping of at least one hotlink area in said panoramic scene onto elements of said second non-planar three-dimensional surface, wherein said second environment map is rendered according to varying positions and fields of view to provide a view of said at least one hotlink area in said panoramic scene as seen from different orientations and fields of view.

8. The program storage device of claim 7, wherein each element of said second environment map corresponds to more than one element of said first environment map.

9. The program storage device of claim 7, wherein said first and second environment maps are cylindrical environment maps, wherein said elements of said first and second environment maps are partitioned into a matrix of rows and columns.

10. The program storage device of claim 9, wherein number of rows of said second environment map are a predetermined fraction of said rows of said first environment map.

11. The program storage device of claim 9, wherein number of columns of said second environment map are a predetermined fraction of said columns of said first environment map.

12. The program storage device of claim 7, wherein said hotlink data associated with said at least one element of said second environment map comprises:

a color value associated with said at least element of said second environment map, and an entry in a table associating said color value with data identifying said action to be performed upon user selection of said at least one of said element of said first environment map.

13. A method for displaying a hotlink area in a panoramic scene by a first environment map comprising a plurality of elements of a first non-planar three-dimensional surface each associated with a color value representing color of a corresponding element, wherein said first environment map represents a mapping of said panoramic scene onto elements of said first environment map, and wherein said first environment map is rendered according to varying positions and fields of view to provide a view of said panoramic scene as seen from different orientations and fields of view, the method comprising the steps of:

storing in memory a second environment map comprising a plurality of elements of a second non-planar three-dimensional surface, wherein said elements of said second environment map correspond to said elements of said first environment map according to a mapping function, and wherein at least one element of said second environment map is associated with hotlink data identifying an action to be performed upon user selection of at least one element of said first environment map that corresponds to said at least one element of said second environment map, wherein said second environment map represents a mapping of at least one hotlink area in said panoramic scene onto elements of said second non-planar three-dimensional surface, wherein said second environment map is rendered according to varying positions and fields of view to provide a view of said at least one hotlink area in said panoramic scene as seen from different orientations and fields of view;

identifying said at least one element of said second environment map;

modifying color value of said elements of said first environment map that correspond to said at least one element of said second environment map, thereby producing a modified first environment map; and rendering said modified first environment map.

14. The method of claim 13, wherein said modifying step is reversible.

15. The method of claim 14, wherein said modifying step utilizes a MOD function.

16. The method of claim 14, wherein said identifying step, modifying step and rendering step are performed in response to a predetermined user input command.

17. The method of claim 13, wherein said identifying step includes the step of analyzing said hotlink data associated with a plurality of elements of said second environment map.

18. The method of claim 17, wherein said hotlink data associated with said at least one element of said second environment map comprises a color value associated with said elements of said second environment map.

19. The method of claim 18, wherein said hotlink data associated with said at least one element of said second environment map comprises an entry in a table associating said color value with data identifying said action to be performed upon user selection of said at least one of said elements of said first environment map.

20. A program storage device readable by a machine, tangibly embodying a program of instructions executable by the machine to perform method steps for displaying a hotlink area in a panoramic scene by a first environment map, said first environment map comprising a plurality of elements of a first non-planar three-dimensional surface each associated with a color value representing color of a corresponding element, wherein said first environment map represents a mapping of said panoramic scene onto elements of said first environment map, and wherein said first environment map is rendered according to varying positions and fields of view to provide a view of said panoramic scene as seen from different orientations and fields of view, the method steps comprising:

storing in memory a second environment map comprising a plurality of elements of a second non-planar three-dimensional surface, wherein said elements of said second environment map correspond to said elements of said first environment map according to a mapping function, and wherein at least one element of said second environment map is associated with hotlink data identifying an action to be performed upon user selection of at least one element of said first environment map that corresponds to said at least one element of said second environment map, wherein said second environment map represents a mapping of at least one hotlink area in said panoramic scene onto elements of said second non-planar three-dimensional surface, wherein said second environment map is rendered according to varying positions and fields of view to provide a view of said at least one hotlink area in said panoramic scene as seen from different orientations and fields of view;

identifying said at least one element of said second environment map;

modifying color value of said elements of said first environment map that correspond to said at least one element of said second environment map, thereby producing a modified first environment map; and rendering said modified first environment map.

21. The program storage device of claim 20, wherein said modifying step is reversible.

22. The program storage device of claim 21, wherein said modifying step utilizes a MOD function.

23. The program storage device of claim 20, wherein said identifying step, modifying step and rendering step are performed in response to a predetermined user input command.

24. The program storage device of claim 21, wherein said identifying step includes the step of analyzing said hotlink data associated with a plurality of elements of said second environment map.

25. The program storage device of claim 24, wherein said hotlink data associated with said at least one element of said second environment map comprises a color value associated with said elements of said second environment map.

26. The program storage device of claim 25, wherein said hotlink data associated with said at least one element of said second environment map comprises an entry in a table associating said color value with data identifying said action to be performed upon user selection of said at least one of said elements of said first environment map.

27. A method for defining a hotlink area in a three-dimensional panoramic scene comprising the steps of:

providing a first environment map representing said panoramic scene, wherein said first environment map comprises a plurality of elements each associated with a color value representing color of the corresponding element, each of said elements being identifiable by and providing data observed via an elevation angle and an azimuth angle about an origin of the map, wherein identification of individual ones of said elements by said azimuth angle and said elevation angle preserves data of the panoramic scene observed at the respective azimuth and elevation angles to enable a viewing of the data from a selectable viewing point;

generating a second environment map comprising a plurality of elements identified by coordinates of rows and columns, coordinate values of the elements of said second environment map being obtained by scaling coordinate values of elements of said first environment map, the scaling serving as a mapping function for reducing the number of pixels in the second environment map, wherein said elements of said second environment map correspond to said elements of said first environment map according to the mapping function and include a designation of color value for corresponding elements of said first environment map, and wherein at least one element of said second environment map is associated with hotlink data identifying an action to be performed upon user selection of at least one element of said first environment map that corresponds to said at least one element of said second environment map;

scanning the rows and the columns of said second environment map for reading data of the elements thereof; and modifying coloration of said first environment map in accordance with the data of said second environment map to identify a hot link.

28. A program storage device readable by a machine, tangibly embodying data to be utilized by the machine in the execution of a program of instructions, the data comprising:

a first environment map representing a three-dimensional panoramic scene, wherein said first environment map comprises a plurality of elements each associated with a color value representing color of the corresponding element, each of said elements being identifiable by and providing data observed via an elevation angle and an azimuth angle about an origin of the map, wherein identification of individual ones of said elements by said azimuth angle and said elevation angle preserves data of the panoramic scene observed at the respective azimuth and elevation angles to enable a viewing of the data from a selectable viewing point;

a second environment map comprising a plurality of elements identified by coordinates of rows and columns, coordinate values of the elements of said second environment map being obtained by scaling coordinate values of elements of said first environment map for reducing the number of pixels in the second environment map, the scaling serving as a mapping function, wherein said elements of said second environment map correspond to said elements of said first environment map according to the mapping function and include a designation of color value for corresponding elements of said first environment map, and wherein at least one element of said second environment map is associated with data identifying an action to be performed upon user selection of at least one element of said second environment map;

wherein the machine includes means for scanning the rows and the columns of said second environment map for reading data of the elements thereof; and means for modifying coloration of said first environment map in accordance with the data of said second environment map to identify a hot link.

29. A method for displaying a hotlink area in a three-dimensional panoramic scene represented by a first environment map, wherein said first environment map comprises a plurality of elements each associated with a color value representing color of the corresponding element, each of said elements being identifiable by and providing data observed via an elevation angle and an azimuth angle about an origin of the map, wherein identification of individual ones of said elements by said azimuth angle and said elevation angle preserves data of the panoramic scene observed at the respective azimuth and elevation angles to enable a viewing of the data from a selectable viewing point, the method comprising the steps of:

storing in memory a second environment map comprising a plurality of elements identified by coordinates of rows and columns, coordinate values of the elements of said second environmental map being obtained by scaling coordinate values of elements of said first environmental map, the scaling serving as a mapping function, wherein said elements of said second environment map correspond to said elements of said first environment map according to the mapping function and include a designation of color value for corresponding elements of said first environment map, said mapping function serving to reduce the number of pixels in the second environment map, and wherein at least one element of said second environment map is associated with hotlink data identifying an action to be performed upon user selection of at least one element of said first environment map that corresponds to said at least one element of said second environment map;

identifying said at least one element of said second environment map;

modifying color value of said elements of said first environment that correspond to said at least one element of said second environment, thereby producing a modified first environment map; and rendering said modified first environment map;

wherein said modifying step includes steps of scanning the rows and the columns of said second environment map for reading data of the elements thereof; and modifying coloration of said first environment map in accordance with the data of said second environment map to identify a hot link.

30. A program storage device readable by a machine, tangibly embodying a program of instructions executable by the machine to perform method steps for displaying a hotlink area in a three-dimensional panoramic scene represented by a first environment map, wherein said first environment map comprises a plurality of elements each associated with a color value representing color of the corresponding element, each of said elements being identifiable by and providing data observed via an elevation angle and an azimuth angle about an origin of the map, wherein identification of individual ones of said elements by said azimuth angle and said elevation angle preserves data of the panoramic scene observed at the respective azimuth and elevation angles to enable a viewing of the data from a selectable viewing point, the method steps comprising:

storing in memory a second environment map comprising a plurality of elements identified by coordinates of rows and columns, coordinate values of the elements of said second environment map being obtained by scaling coordinate values of elements of said first environment map, the scaling serving as a mapping function for reducing the number of pixels in the second environment map, wherein said elements of said second environment map correspond to said elements of said first environment map according to the mapping function and include a designation of color value for corresponding elements of said first environment map, and wherein at least one element of said second environment map is associated with hotlink data identifying an action to be performed upon user selection of at least one element of said first environment map that correspond to said at least one element of said second environment map;

identifying said at least one element of said second environment map;

modifying color value of said elements of said first environment map that correspond to said at least one element of said second environment map, thereby producing a modified first environment map; and rendering said modified first environment map;

wherein said modifying comprises scanning the rows and the columns of said second environment map for reading data of the elements thereof; and modifying coloration of said first environment map in accordance with the data of said second environment map to identify a hot link.

31. A method for defining a hotlink area in a panoramic scene comprising the steps of:

providing a first environment map representing said panoramic scene, wherein said first environment map comprises a plurality of elements each associated with a color value representing color of the corresponding element, said first environment map containing data of plural perspective views of subject matter of the scene, wherein said data is observed via coordinates of individual ones of said elements, said coordinates serving to preserve data of the panoramic scene to enable a viewing of the data from a selectable viewing point;

generating a second environment map comprising a plurality of elements identified by coordinates of rows and columns, coordinate values of the elements of said second environment map being obtained by scaling coordinate values of hot-spot elements of said first environment map, the scaling serving as a mapping function for reducing the number of pixels in the second environment map, wherein said elements of said second environment map correspond to said hot-spot elements of said first environment map according to the mapping function and include a designation of color value for corresponding elements of said first environment map, and wherein at least one element of said second environment map is associated with hotlink data identifying an action to be performed upon user selection of at least one element of said first environment map that corresponds to said at least one element of said second environment map;

scanning the rows and the columns of said second environment map for reading data of the elements thereof; and modifying coloration of said first environmental map in accordance with the data of said second environment map to identify a hot link.

32. A program storage device readable by a machine, tangibly embodying data to be utilized by the machine in the execution of a program of instructions, the data comprising:

a first environment map representing a panoramic scene, wherein said first environment map comprises a plurality of elements each associated with a color value representing color of the corresponding element, said first environmental map containing data of plural perspective views of subject matter of the scene, wherein said data is observed via coordinates of individual ones of said elements, said coordinates serving to preserve data of the panoramic scene to enable a viewing of the data from a selectable viewing point;

a second environment map comprising a plurality of elements identified by coordinates of rows and columns, coordinate values of the elements of said second environmental map being obtained by scaling coordinate values of hot-spot elements of said first environmental map, the scaling serving as a mapping function for reducing the number of pixels in the second environment map, wherein said hot-spot elements of said second environment map correspond to said elements of said first environment map according to the mapping function and include a designation of color value for corresponding elements of said first environment map, and wherein at least one element of said second environment map is associated with data identifying an action to be performed upon user selection of at least one element of said second environment map;

wherein the machine includes means for scanning the rows and the columns of said second environment map for reading data of the elements thereof; and means for modifying coloration of said first environment map in accordance with the data of said second environment map to identify a hot link.

33. A method for displaying a hotlink area in a panoramic scene represented by a first environment map, wherein said first environment map comprises a plurality of elements each associated with a color value representing color of the corresponding element, said first environmental map containing data of plural perspective views of subject matter of the scene, wherein said data is observed via coordinates of individual ones of said elements, said coordinates serving to preserve data of the panoramic scene to enable a viewing of the data from a selectable viewing point, the method comprising the steps of:

storing in memory a second environment map comprising a plurality of elements identified by coordinates of rows and columns, coordinate values of the elements of said second environment map being obtained by scaling coordinate values of hot-spot elements of said first environment map, the scaling serving as a mapping function for reducing the number of pixels in the second environment map, wherein said elements of said second environment map correspond to said hot-spot elements of said first environment map according to the mapping function and include a designation of color value for corresponding elements of said first environment map, and wherein at least one element of said second environment map is associated with hotlink data identifying an action to be performed upon user selection of at least one element of said first environment map that corresponds to said at least one element of said second environment map;

identifying said at least one element of said second environment map;

modifying color value of said elements of said first environment that correspond to said at least one element of said second environment, thereby producing a modified first environment map; and rendering said modified first environment map;

wherein said modifying step includes steps of scanning the rows and the columns of said second environment map for reading data of the elements thereof; and modifying coloration of said first environment map in accordance with the data of said second environment map to identify a hot link.

34. A program storage device readable by a machine, tangibly embodying a program of instructions executable by the machine to perform method steps for displaying a hotlink area in a panoramic scene represented by a first environment map, wherein said first environment map comprises a plurality of elements each associated with a color value representing color of the corresponding element, said first environmental map containing data of plural perspective views of subject matter of the scene, wherein said data is observed via coordinates of individual ones of said elements, said coordinates serving to preserve data of the panoramic scene to enable a viewing of the data from a selectable viewing point, the method steps comprising:

storing in memory a second environment map comprising a plurality of elements, the elements of said second environmental map being obtained by scaling coordinate values of hot-spot elements of said first environmental map, the scaling serving as a mapping function for reducing the number of pixels in the second environment map, wherein said hot-spot elements of said second environment map correspond to said elements of said first environment map according to the mapping function, and wherein at least one element of said second environment map is associated with hotlink data identifying an action to be performed upon user selection of at least one element of said first environment map that correspond to said at least one element of said second environment map;

identifying said at least one element of said second environment map;

modifying color value of said elements of said first environment that correspond to said at least one element of said second environment, thereby producing a modified first environment map; and rendering said modified first environment map;

wherein said modifying step includes steps of scanning the rows and the columns of said second environment map for reading data of the elements thereof; and modifying coloration of said first environment map in accordance with the data of said second environment map to identify a hot link.

* * * * *